United States Patent [19]

Fuse

[11] 3,745,405

[45] July 10, 1973

[54] MISCONVERGENCE COMPENSATING DEVICE FOR COLOR CATHODE RAY TUBES

[75] Inventor: Yuzo Fuse, Tokyo, Japan

[73] Assignee: Sony Corporation, Tokyo, Japan

[22] Filed: Feb. 12, 1971

[21] Appl. No.: 114,982

[30] Foreign Application Priority Data

Feb. 28, 1970 Japan ............................ 45/19742

[52] U.S. Cl. ..... 315/13 CG, 315/13 C, 315/27 XY, 315/27 GD

[51] Int. Cl. ............................................ H01j 29/50

[58] Field of Search ..................... 315/13 C, 13 CG, 315/27 GD, 27 XY, 31 TY, 27 TD

[56] References Cited

UNITED STATES PATENTS

| | | | |
|---|---|---|---|
| 3,419,749 | 12/1968 | Gerstein | 315/13 C |
| 3,456,149 | 7/1969 | Van Mast | 315/27 XY |
| 3,531,682 | 9/1970 | Jarosz | 315/13 C |
| 3,548,248 | 12/1970 | Tokita et al. | 315/13 C |
| 3,560,793 | 2/1971 | Payen | 315/13 C |
| 3,613,108 | 10/1971 | Spannhake | 315/13 C |
| 3,613,109 | 10/1971 | Jarosz | 315/13 C |

FOREIGN PATENTS OR APPLICATIONS

| | | | |
|---|---|---|---|
| 1,046,672 | 12/1958 | Germany | 315/13 C |

*Primary Examiner*—Carl D. Quarforth
*Assistant Examiner*—P. A. Nelson
*Attorney*—Lewis H. Eslinger, Alvin Sinderbrand and Curtis, Morris & Safford

[57] ABSTRACT

In a color cathode ray tube comprising a color screen having arrays of different color phosphors, beam selecting means provided with passages corresponding to the arrays of color phosphors, plural-beam generating means for directing a plurality of electron beams in a common plane toward the screen for impingement on respective phosphors of the arrays through the corresponding passages, and a deflecting means for causing the plurality of electron beams to scan on the screen and including a pair of deflection coil means connected in parallel to each other for generating nonuniform magnetic fields; misconvergence of the beams is corrected by a device including variable impedance means connected in series to at least one of the deflection coil means for adjustably controlling the magnetic field produced thereby.

11 Claims, 15 Drawing Figures

INVENTOR.
YUZO FUSE
BY
Louis H. Eslinger

INVENTOR
YUZO FUSE

BY

INVENTOR.
YUZO FUSE

BY

Lewis H. Eslinger

MISCONVERGENCE COMPENSATING DEVICE FOR COLOR CATHODE RAY TUBES

BACKGROUND OF THE INVENTION

1. Field of the Invention

This invention relates to color cathode ray tubes, and more particularly is directed to a misconvergence compensating device for correcting misconvergence of the electron beams in such tubes.

2. Description of the Prior Art

In order to eliminate the misconvergence of the electron beams which results from errors in mounting of the cathodes in a tube envelope, extreme care is required in the mounting of the cathodes. If the cathodes have been mounted eccentrically in the tube envelope, the misconvergence of the electron beams emitted from the cathodes, and which is caused by the eccentric mounting, has been corrected by a coil specially mounted on the neck portion of the tube envelope. Further, some misconvergence may be caused by an error in the mounting of the deflection yoke means on the tube envelope, so that special attention is required in the mounting of the deflection yoke means. Thus, heretofore, extreme care has had to be exercised in assembling the tube to minimize misconvergence and, to the extent that the misconvergence could not be completely avoided by such care, additional devices had to be assembled in the tube.

SUMMARY OF THE INVENTION

In connection with this invention, a color cathode ray tube comprising a color screen having arrays of different color phosphors, beam selecting means provided with passages corresponding to the arrays of color phosphors, beam generating means for directing a plurality of electron beams in a common plane toward the color screen for impingement on respective phosphors of the arrays through the corresponding passages and deflecting means for causing the electron beams to scan the color screen and including a pair of deflection coil means connected in parallel to each other for generating nonuniform magnetic fields, has misconvergence of the beams corrected by variable impedance means connected to at least one of the deflection coil means for controlling the magnetic field established thereby.

Accordingly, it is an object of this invention to avoid cross-misconvergence of electron beams in color cathode ray tubes.

It is another object of this invention to avoid neck-twist-misconvergence of electron beams in color cathode ray tubes.

It is still another object of this invention to avoid tilt-misconvergence of electron beams in color cathode ray tubes.

It is a further object of this invention to avoid the aforementioned misconvergences of the beams in color cathode ray tubes that result from magnetic fields established by the deflecting means.

It is still a further object of this invention to avoid the aforementioned misconvergences in color cathode ray tubes that result from magnetic fields of the deflecton coils by connecting the latter with variable impedance means.

It is still another object of this invention to provide a misconvergence compensating device for color cathode ray tubes which is simple in construction and easy to handle.

The above, and other objects, features and advantages of this invention will become apparent from the following description of illustrative embodiments which is to be read in conjunction with the accompanying drawings.

DESCRIPTION OF THE PREFERRED EMBODIMENTS

Figure 1:
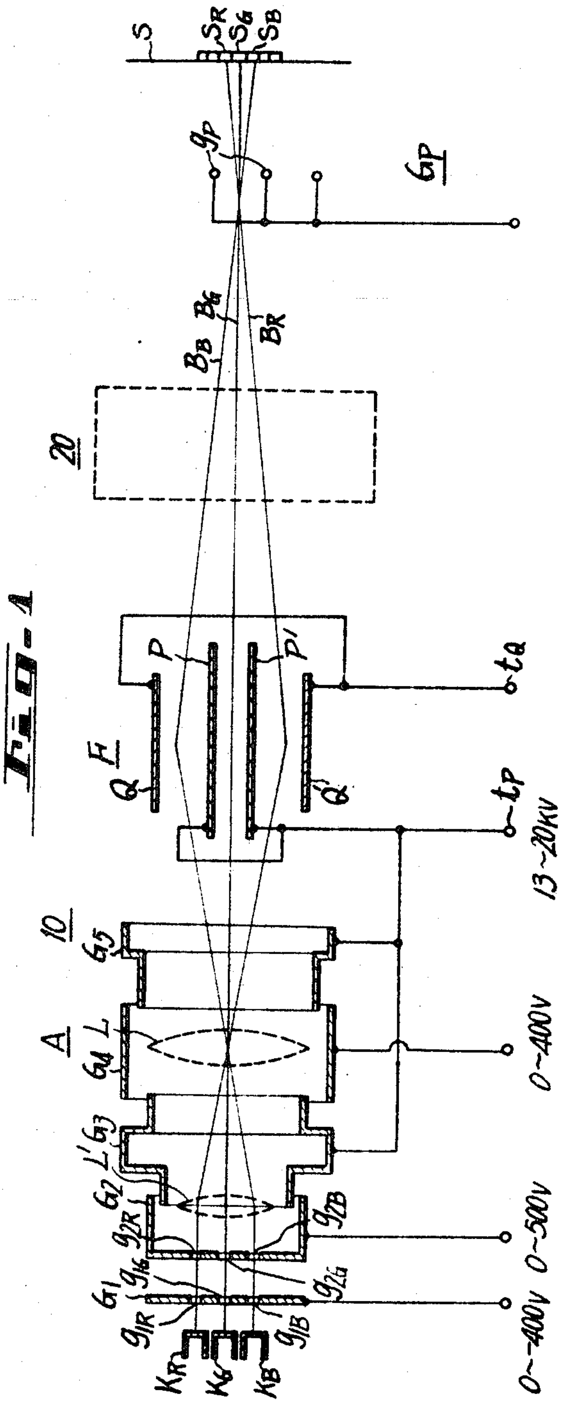
FIG. 1 is a schematic sectional view in a horizontal plane passing through the axis of a single-gun, plural-beam color picture tube of the type to which this invention is applied.

Referring to the drawings in detail, and initially to FIG. 1 thereof, it will be seen that a single-gun, plural-beam color picture tube 10 to which this invention is applied may be of the type disclosed in detail in U.S. Pat. No. 3,448,316, issued June 3, 1969, and having a common assignee herewith. The tube 10 may comprise a glass envelope (not shown) having a neck and a cone extending from the neck to a color screen S provided with the usual arrays of color phosphors $S_RS_G$ and $S_B$ and with an apertured beam selecting grid or shadown mask $G_P$. Disposed within the neck is a single electron gun A having cathodes $K_R$, $K_G$ and $K_B$ which constitute beam-generating sources with the respective beam-generating surfaces thereof disposed as shown in a plane which is substantially perpendicular to the axis of the electron gun. In the embodiment shown, the beam-generating surfaces are arranged in a straight line so that the respective beams $B_R$, $B_G$ and $B_B$ emitted therefrom are directed in a substantially horizontal plane containing the axis of the gun, with the central beam $B_G$ being coincident with such axis. A first grid $G_1$ is spaced from the beam-generating surfaces of cathodes $K_R$, $K_G$ and $K_B$ and has apertures $g_{1R}$, $g_{1G}$ and $g_{1B}$ formed therein in alignment with the respective cathode beam-generating surfaces. A common grid $G_2$is spaced from the first grid $G_1$ and has apertures $g_{1R}$ , $g_{1G}$ and $g_{1B}$ formed therein in alignment with the respective apertures of the first grid $G_1$. Successively arranged in the axial direction away from the common grid $G_2$ are open-ended, tubular grids or electrodes $G_3$, $G_4$ and $G_5$, respectively, with cathodes $K_R$, $K_G$ and $K_B$, grids $G_1$ and $G_2$, and electrodes $G_3$, $G_4$ and $G_5$ being maintained in the depicted assembled positions thereof, by suitable, nonillustrated support means of an insulating material.

For operation of the electron gun of FIG. 1, appropriate voltages are applied to the grids $G_1$ and $G_2$ and to the electrodes $G_3$, $G_4$ and $G_5$. Thus, for example, a voltage of 0 to minus 400V is applied to the grid $G_1$, a voltage of 0 to 500V is applied to the grid $G_2$, a voltage of 13 to 20KV is applied to the electrodes $G_3$ and $G_5$, and a voltage of 0 to 400V is applied to the electrode $G_4$, with all of these voltages being based upon the cathode voltage as a reference. As a result, the voltage distributions between the respective electrodes and cathodes, and the respective lengths and diameters thereof, may be substantially identical with those of a unipotential-single beam type electron gun which is constituted by a single cathode and first and second, single-apertured grids.

With the applied voltage distribution as described hereinabove, an electron lens field will be established between grid $G_2$ and the electrode $G_3$ to form an auxiiary lens L′ as indicated in dashed lines, and an electron lens field will be established around the axis of the electrode $G_4$, by the electrodes $G_3$, $G_4$ and $G_5$, to form a main lens L, again as indicated in dashed lines. In a typical use of electron gun A, bias voltages of 100V, 0V, 300V, 20KV, 200V and 20V may be applied respectively to the cathodes $K_R$, $K_G$ and $K_B$, the first and second grids $G_1$ and $G_2$ and the electrodes $G_3$, $G_4$ and $G_5$.

Further included in the electron gun of FIG. 1 are electron beam convergence deflecting means F which comprise shielding plates P and P′ disposed in the depicted spaced relationship at opposite sides of the gun axis, and axially extending, deflector plates Q and Q′ which are disposed, as shown, in outwardly spaced, opposed relationship to shielding plates P and P′, respectively. Although depicted as substantially straight, it is to be understood that the deflector plates Q and Q′ may, alternatively, be somewhat curved or outwardly bowed, as is well known in the art.

The shielding plates P and P′ are equally charged and disposed so that the central electron beam $B_G$ will pass substantially undeflected between the shielding plates P and P′, while the deflector plates Q and Q′ have negative charges with respect to the plates P and P′ so that respective electron beams $B_B$ and $B_R$ will be convergently deflected as shown by the respective passges thereof between the plates P and Q and the plates P′ and Q′. More specifically, a voltage $V_P$ which is equal to the voltage applied to the electrode $G_5$, may be applied to both shielding plates P and P′, and a volaage $V_Q$, which is some 200 to 300V lower than the voltage $V_P$, is applied to the respective deflector plates Q and Q′ to result in the respective shielding plates P and P′ being at the same potential, and to result in the application of a deflecting voltage difference or convergence deflecting voltages between the respective plates P′ and Q′ and P and Q and it is, of course, this convergence defleciing voltage $V_C$ which will impart the requisite convergent deflection to the respective electron beams $B_B$ and $B_R$.

In operation, the respective electron beams $B_R$, $B_G$ and $B_B$ which emanate from the beam generating surfaces of the cathodes $K_R$, $K_G$ and $K_B$ will pass through the respective grid apertures $g_{1R}$, $g_{1G}$ and $g_{1B}$, to be intensity modulated with what may be termed the "red," "green" and "blue" intensity modulation signals applied between the said cathodes and the first grid $G_1$. The respective electron beams will then pass through the common auxiliary lens L′ by which the beams are made to cross each other at the center of the main lens L and to emerge from the latter with beams $B_R$ and $B_B$ diverging from beam $B_G$. Thereafter, the central electron beam $B_G$ will pass substantially undeflected between shielding plates P and P′ since the latter are at the same potential. Passage of the electron beam $B_B$ between the plates P′ and Q′ and of the electron beam $B_R$ between the plates P and Q will however, result in the convergent deflections thereof as a result of the convergence deflecting voltage applied therebetween, and the system of FIG. 1 is so arranged that the electron beams $B_B$, $B_G$ and $B_R$ will desirably converge or cross each other at a common spot centered in an aperture or passage between adjacent grid wires $g_p$ of the beam selecting grid or mask $G_p$ so as to diverge therefrom to strike the respective color phosphors of a corresponding array thereof on screen S. More specifically, it may be noted that the color phosphor screen S is composes of a large plurality of sets or arrays of vertically extending "red," "green" and "blue" phosphor stripes or dots $S_RS_G$ and $S_B$ with each of the arrays or sets of color phosphors forming a color picture element as in a chromatron type color picture tube. Thus, it will be understood that the common spot of beam convergence corresponds to one of the thusly formed color picture elements.

The voltage $V_p$ may also be applied to the lens electrodes $G_3$ and $G_5$ and to the screen S as an anode voltage in conventional manner through a non-illustrated graphite layer which is provided on the inner surface of the cone portion of the tube envelope. The grid wires of screen grid $G_p$ may have a post-focussing voltage ranging, for example, from 6 to 7 KV applied thereto. Thus, to summarize the operation of the depicted color picture tube of FIG. 1, the respective electron beams $B_BB_G$ and $B_R$ will be converged at screen grid $G_p$ and will diverge therefrom in such manner that electron beam $B_B$ will strike the "blue" phosphor $S_B$, electron beam $B_G$ will strike the "green" phosphor $S_G$ and electron beam $B_R$ will strike the "red" phosphor $S_R$ of the array or set corresponding to the grid aperture at which the beams converge. Electron beam scanning of the face of the color phosphor screen is effected by deflecting means comprised of horizontal and vertical deflection coil means indicated in broken lines at 20 and which receives horizontal and vertical sweep signals whereby a color picture will be provided on the color screen. Since, with this arrangement, the respective electron beams are each passed, for focussing, through the center of the main lens L of the electron gun A, the beam spot formed by impingement of the beams on the color phosphor screen S will be substantially free from the effects of coma and/or astigmatism of the said main lens, whereby improved color picture resolution will be provided.

It will be apparent that, when beams $B_RB_G$ and $B_B$ are deflected by deflecting means 20 from a point of convergence at the center of grid $G_p$ and screen S, as during scanning of the screen, the distances that such beams travel through the deflecting means 20 are relatively varied, that is, the beams undergo different degrees of deflection and this may result in misconvergence of the beams, particularly when the latter are directed at corner portions of the screen.

Figure 2:
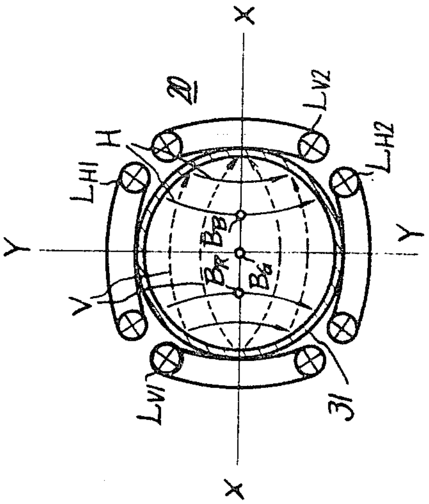
FIG. 2 is a schematic end elevational view of a deflecting means for the tube of FIG. 1, and showing the pattern of the magnetic lines of flux in the magnetic fields produced by such deflecting means.

The misconvergences mentioned above are compensated for by establishing magnetic deflectin fields in the form of a pin cushion and barrel with the deflection coil means 20 as disclosed in the U.S. Pat. No. 3500,114. More specifically, the coil means 20 may comprise a pair of horizontal deflection coils $L_{H1}$ and $L_{H2}$ and a pair of vertical deflection coils $L_{V1}$ and $L_{V2}$ mounted on a picture tube 10 at its neck portion 31, as shown in FIG. 2. In the illustrated example, all the deflection coils are saddle-shaped and the horizontal deflection coils $L_{H1}$ and $L_{H2}$ for producing a pin-cushion-shaped magnetic field H are disposed above and below the neck portion 31 in opposing relation to each other and the vertical deflecion coils $L_{V1}$ and $L_{V2}$ for producing a barrel-shaped magnetic field V are respectively disposed on the left and right sides of the neck portion 31 in opposing relation to each other. The horizontal and vertical deflection magnetic fields H and V established by the deflection coils act on the three electron beams $B_R$, $B_G$ and $B_B$ simultaneously.

If the gun A and coils $L_{H1}$, $L_{H2}$, $L_{V1}$ and $L_{V2}$ are all mounted in exactly the correct positional relationships to each other, the deflection coils are disposed in such a manner that the electron beam $B_G$ may pass through the intersection of the axis of symmetry X—X of the horizontal deflection magnetic field H with the axis of symmetry Y—Y of the vertical deflection magnetic field V and the electron beams $B_R$ and $B_B$ may pass through points on the axis X—X which are symmetrically spaced from the axis Y—Y, thereby to avoid the misconvergence of electron beams.

Figure 3:
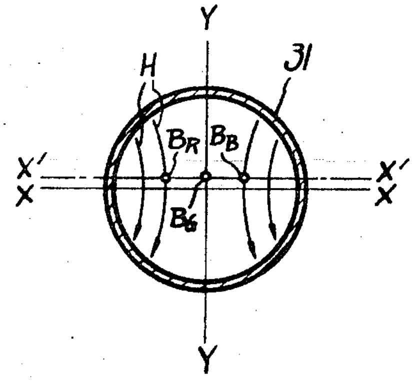
FIG. 3 is a diagrammatic showing of the electron beams and the magnetic lines of flux in a magnetic field established by a horizontal deflection coil, and to which reference will be made in explaining this invention.
Figure 4:
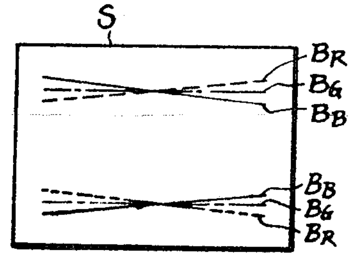
FIG. 4 is a diagrammatic representation of the so-called cross-misconvergence on the screen scanned by the electron beams when the latter are improperly positioned as depicted in FIG. 3.

However, in the event that the three electron beams $B_R$, $B_G$ and $B_B$ are deviated in the direction of the axis Y—Y away from the axis X—X to a line X'—X' parallel to axis X—X by errors introduced in the mounting of the cathodes $K_R$, $K_G$ and $K_B$, as depicted in FIG. 3, a so-called cross-misconvergence is caused on the screen S as depicted in FIG. 4 because the horizontal deflection magnetic field H is pin-cushioned in shape.

Figure 5:
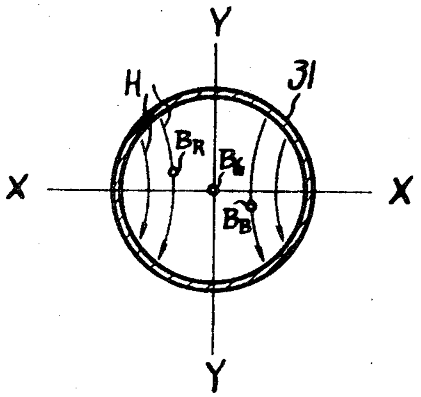
FIG. 5 is a diagrammatic view similar to that of FIG. 3, but showing another form of deviation of the beams from the proper position thereof.
Figure 6:
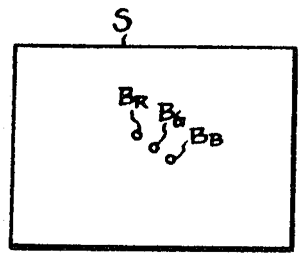
FIG. 6 is a schematic illustration of the so-called twist-misconvergence on the screen scanned by the electron beams positioned as depicted in FIG. 5.

In the event that the side electron beams $B_R$ and $B_B$ deviate from the axis X—X in the direction of the axis Y—Y in opposing relation to each other, as shown in FIG. 5, a so-called neck-twist is caused as illustrated in FIG. 6.

This invention has for its object to provide a device which is simple in construction but capable of electrically correcting or eliminating the cross-misconvergence and neck twist shown on FIGS. 4 and 6.

One example of this invention will now be described with reference to FIG. 7.

Figure 8:
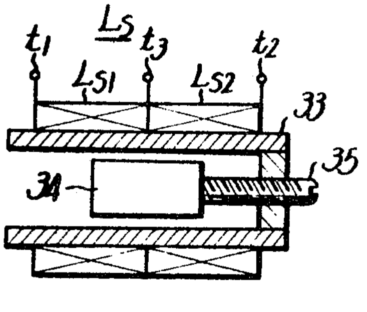
FIG. 8 is a sectional view of a variable impedance means that may be employed in the circuit of FIG. 7.

In accordance with the present invention, variable impedance means, for example, first and second auxiliary coils $L_{S1}$ and $L_{S2}$ are respectively connected in series with the horizontal deflection coils $L_{H1}$ and $L_{H2}$ and are further connected to a horizontal deflection circuit (not shown) through terminals 32A and 32B. These auxiliary coils $L_{S1}$ and $L_{S2}$ are parts of a coil $L_S$ (FIG. 8) wound on a common bobbin 33 in the same direction. A core 34 is movable in the bobbin 33 by a screw 35 to serve as a variable inductance, and the opposite ends of the coil $L_S$ and the mid point therebetween are connected to terminals $t_1$, $t$ connected and $t_3$ so that the coil portion between terminals $t_1$ and $t_2$ and that between $t_2$ and $t_3$ respectively serve as the coils $L_{S1}$ and $L_{S2}$. Accordingly, in the illustrated example the deflection coils $L_{H1}$ and $L_{H2}$ are respectively connected at one end to the terminal 32A and at the other end to the terminals $t_1$ and $t_2$ of the coil $L_S$ and the terminal $t_3$ of the coil $L_S$ is connected to the terminal 32B.

Further, a first rectifier $D_1$, a variable resistor $V_R$ and a second rectifier $D_2$ opposite in polarity to rectifier $D_1$ are connected in series to one another and the resulting series circuit is connected in parallel to the coil $L_S$ and a slider V*a* of the variable resistor $V_R$ is connected to the terminal 32B.

With such an arrangement, the cross-misconvergence can be corrected by adjustment of the core 34 of coil $L_S$ and the neck twist can be corrected by adjustment of the variable resistor $V_R$. That is, if the core of the coil $L_S$ is adjusted, the inductance values of the coils $L_{S1}$ and $L_{S2}$ become different from each other, so that the horizontal deflection current flowing in one of the deflection coils $L_{H1}$ and $L_{H2}$ becomes smaller and the other becomes greater. Therefore, as a result of the adjustment of coil $L_S$, the axis of symmetry X—X of the horizontal deflection magnetic field H is apparently shifted in the direction of the axis Y—Y in FIG. 3. Thus, the axis of symmetry X—X is brought into agreement with the line X'—X' on which the electron beams $B_R$, $B_G$ and $B_B$ lie, thereby essentially correcting or eliminating the cross-misconvergence.

Figures 9A, 9B:
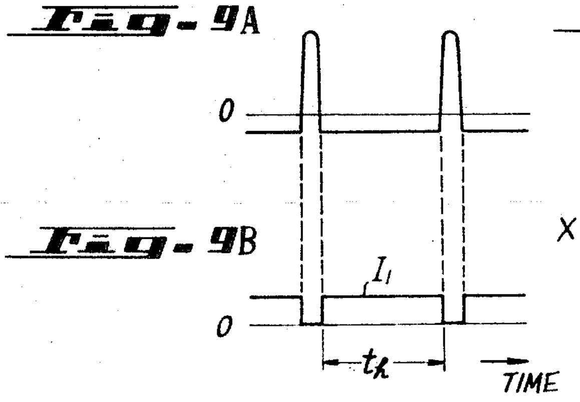
FIGS. 9A and 9B show current waveforms to which reference will be made in explaining the operation of the circuit depicted in FIG. 7.
Figure 10:
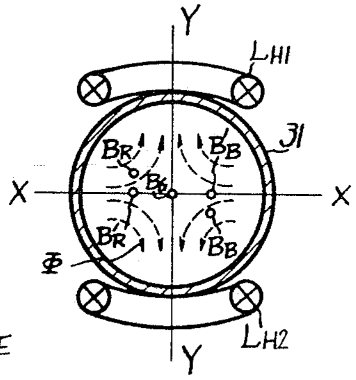
FIG. 10 is a diagrammatic showing of the electron beams and of the magnetic lines of flux in a magnetic field established by a DC current for compensating for the misconvergence shown in FIG. 5.

The coil $L_S$ is supplied with a pulse voltage, such as depicted in FIG. 9A, which is divided from the horizontal deflection voltage. Since this pulse voltage is rectified by the rectifier $D_1$, a current $I_1$ circulates in the coils $L_{H1}$ and $L_{H2}$ (FIG. 7) in the horizontal scanning period $t_h$ (FIG. 9B). Similarly, a current $I_2$ (FIG. 7) rectified by the rectifier $D_2$ circulates in the coils $L_{H1}$ and $L_{H2}$ in a direction opposite to the current $I_1$. Thus, the coils $L_{H1}$ and $L_{H2}$ are actually supplied with a current $I_1$—$I_2$ which is the difference between the currents $I_1$ and $I_2$ as determined by the adjustment of the variable resistor $V_R$, thus correcting for certain deviations of the electron beams. More specifically, in order to compensate for the neck twist shown in FIG. 5, the slider V*a* of the variable resistor $V_R$ is moved to the left of the center thereof, thereby to decrease the value of its resistance on the side of the deflection coil $L_{H1}$. As a result of this, the difference current $I_1$—$I_2$ flows in the direction from the deflection coil $L_{H1}$ to the coil $L_{H2}$ to provide a magnetic flux $\Phi$ such as is depicted in FIG. 10. Consequently, the electron beams $B_R$ and $B_B$ are respectively deflected up and down, as viewed in the figure, and are aligned on the axis X—X.

Since the magnitude and direction of the magnetic flux $\Phi$ can be adjusted by changing the magnitude and direction of the difference current $I_1—I_2$, the magnitude and direction of the magnetic flux $\Phi$ are altered by adjusting the variable resistor $V_R$, thereby correcting the neck twist.

Figure 11:
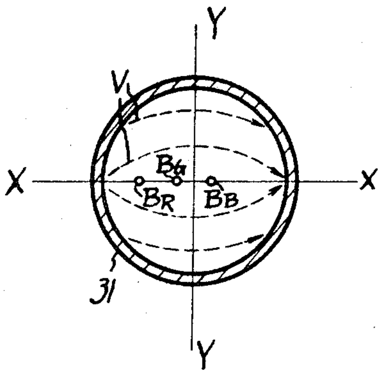
FIG. 11 is a diagrammatic representation of the electron beams which are improperly positioned with respect to the magnetic lines of flux in the magnetic field produced by a vertical deflection coil.
Figure 12:
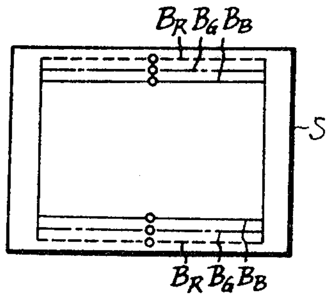
FIG. 12 is a schematic illustration of the so-called tilt-misconvergence on the screen when scanned with the electron beams as shown in FIG. 11.

Further, when the electron beams $B_R$, $B_G$ and $B_B$ are all deviated from their proper positions along the axis X—X, as depicted in FIG. 11, a so-called tilt-misconvergence is generated as shown in FIG. 12.

Figure 13:
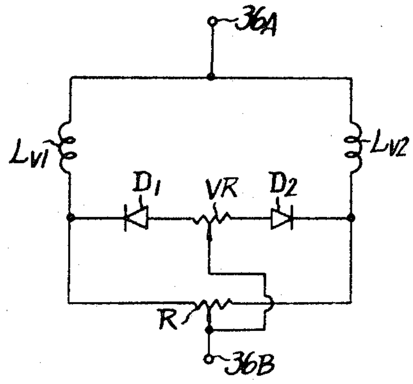
FIG. 13 is a circuit diagram of a means for compensating for the misconvergence depicted in FIG. 12 according to this invention.

FIG. 13 illustrates one example of a circuit according to this invention for correcting the tilt-misconvergence. Reference characters $L_{V1}$ and $L_{V2}$ indicate saddle-shaped vertical deflection coils and numerals 36A and 36B identify terminals connected to a vertical deflection circuit (not shown). A variable resistor R is used as a variable impedance element in place of the previously described coil $L_S$ and its slider is connected to the terminal 36B. The reason for employing the variable resistor R is that the vertical deflection circuit is a resistive circuit which is smaller in power consumption than the horizontal deflection circuit and the power dissipation of the variable resistor R is negligible.

With such an arrangement, the adjustment of the variable resistor R causes a difference between the vertical deflection currents flowing in the left and right vertical deflection coils $L_{V1}$ and $L_{V2}$ to provide different mangetic field distributions. For example, when the slider of the variable resistor R is moved to the left of the center thereof, as depicted in FIG. 13, the vertical deflection current flowing in the vertical deflection coil $L_{V1}$ becomes greater than that flowin in the other coil $L_{V2}$ to shift the center of the vertical deflection magnetic field to an axis parallel to axis Y—Y and passing through the position of beam $B_G$ in FIG. 11, so that the three electron beams $B_G$, $B_R$ and $B_B$ are properly positioned with respect to the center of the magnetic field, thereby to correct the tilt-misconvergence. By connecting the series circuit of the variable resistor $V_R$ and the rectifiers $D_1$ and $D_2$, described with reference to FIG. 7, in parallel to the variable resistor R as depicted in FIG. 13, the misconvergence resulting from the neck twist can be similarly corrected.

Figure 7:
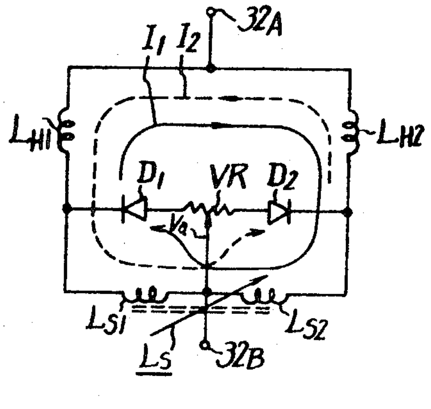
FIG. 7 is a circuit diagram of a deflection means according to this invention for compensating for the misconvergences.
Figure 14:
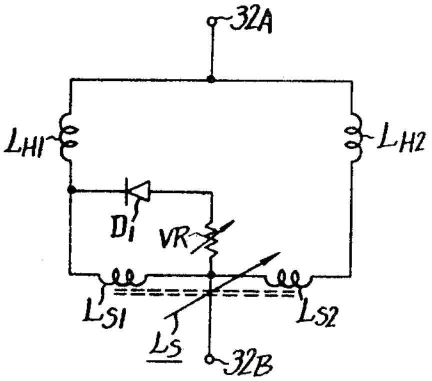
FIG. 14 is a circuit diagram showing another means for compensating for the misconvergence according to this invention.

Further, it is also possible to omit the second rectifier $D_2$ in the circuit of FIG. 7 to simplify it as shown in FIG. 14. In this example, however, the direction of the magnetic flux $\Phi$ is reversed by the reversal of the polarity of the rectifier $D_1$.

Although the present invention has been described in connection with horizontal and vetical deflection coils which are all saddle-shaped, the invention is also applicable to a color picture tube using toroidal deflection coils. Further, the variable impedance means $L_S$ may be connected to one of the deflection coils, rather than to both coils as described.

It will be apparent that many modifications and variations may be effected without departing from the scope of the novel concepts of this invention.

What is claimed is:

1. In the combination of a color cathode ray tube including a color screen having arrays of different color phosphors, beam selecting means provided with passages corresponding to said arrays of color phosphors, plural-beam generating means for directing a plurality of electron beams in a common plane toward said screen for impingement on respective phosphors of said arrays through the corresponding passages, and deflecting means for causing said plurality of electron beams to scan said screen and including a source of deflection voltage and a pair of deflection coil means connected in parallel to each other and to said source of deflection voltage for producing a nonuniform magnetic scanning field; the improvement comprising a misconvergence compensating device including impedance means connected in series between at least one of said pair of deflection coil means and said source of deflection voltage, the magnitude of the impedance of said impedance means being selectively adjustable to vary the amount of current from said source of deflection voltage flowing in said one deflection coil means relative to the other deflection coil means for controlling said magnetic field produced thereby.

2. The combination according to claim 1 wherein said variable impedance means includes first and second variable impedance elements respectively connected in series to said one deflection coil means and to the other of said pair of deflection coil means.

3. The combination according to claim 2, wherein said first and second variable impedance elements are controlled at the same time.

4. The combination according to claim 1, wherein rectifier means and variable resistance means are connected betwenn said pair of deflection coil means.

5. In the combination of a color cathode ray tube including a color screen having arrays of different color phosphors, beam selecting means provided with passages corresponding to said arrays of color phsophors, plural-beam generating means for directing a plurality of electron beams in a common plane toward said screen for impingement on respective phosphors of said arrays through the correspondlng passages, and deflecting means for causing said plurality of electron beams to scan said screen and including a source of deflection voltage and a pair of deflection coil means connected in parallel to each other and to said source of deflection voltage for producing a nonuniform magnetic scanning field; the improvement comprising a misconvergence compensating device including impedance means connected in series between at least one of said pair of deflection coil means and said source of deflection voltage, the magnitude of the impedance of said impedance means being selectively adjustable to vary the amount of current from said source of deflection voltage flowing in said one deflection coil means relative to the other deflection coil means for controlling said magnetic field produced thereby, and rectifier means and variable resistance means connected between said pair of deflection coil means, wherein said rectifier means includes a first rectifier connected to one of said pair of deflection coil means and a second rectifier connected to the other of said pair of deflection coil means, and said variable resistance means is interposed between said first and second rectifiers.

6. The combination according to claim 1, wherein said pair of deflection coil means are horizontal deflection coil means for producing a pin-cushion-shaped magnetic field.

7. The combination according to claim 1, wherein said variable impedance means is constituted by variable inductance means.

8. The combination according to claim 1, wherein said pair of deflection coil means are vertical deflection coil means for producing a barrel-shaped magnetic field.

9. The combination according to claim 8, wherein said variable impedance means connected to said vertical deflection coil means is constituted by variable resistance means.

10. In the combination of a color cathode ray tube including a color screen having arrays of different color phosphors, beam selecting means provided with passages corresponding to said arrays of color phosphors, plural-beam generating means arranged in line for directing a plurality of electron beams in a common plane toward the screen for impingement on respective phosphors of the arrays through the corresponding passages, and deflecting means for causing the plurality of electron beams to scan the screen and including first and second sources of deflection voltage and at least a first and a second pair of deflection coils, the deflection coils of the first pair being connected in parallel to each other and to the first source of deflection voltage for producing a pincushioned-shaped magnetic scanning field, the deflection coils of the second pair being connected in parallel to each other and to the second source of deflection voltage for producing a barrel-shaped magnetic scanning field, the improvement comprising cross-misconvergence compensating means including first impedance means connected in series between at least one of the deflection coils of the first pair and the first source of deflection voltage, the magnitude of the impedance of the first impedance means being selectively adjustable to vary the amount of current from the first source of deflection voltage flowing in the one deflection coil relative to the other deflection coil of the first pair for compensating for cross-misconvergence of the electron beams due to the pincushion shaped magnetic field produced in the first pair of deflection coils and neck twist compensating means including first and second rectifiers and first variable resistance means, the first rectifier being connected to one of the first pair of deflection coils, the second rectifier being connected to the other of the first pair of deflection coils, and the first variable resistance means being connected in series between terminals of like polarity at the first and the second rectifiers and further connected to the first source of deflection voltage for supplying a net rectified current of a predetermined polarity to the first pair of deflection coils.

11. The combination recited in claim 10 further comprising tilt-misconvergence compensating means including second impedance means connected in series between at least one of the deflection coils of the second pair of deflection coils and the second source of deflection voltage, the magnitude of the impedance of the second impedance means being selectively adjustable to vary the amount of current from the second source flowing in the one deflection coil of the second pair and wherein the neck twist compensating means further includes third and fourth rectifiers and second variable resistance means, the third rectifier being connected to one of the second pair of deflection coils, the second rectifier being connected to the other of the second pair of deflection coils, and the second variable resistance means being connected in series between terminals of like polarity at the third and fourth rectifiers and further connected to the second source of deflection voltage for supplying a net rectified current of a predetermined polarity to the second pair of deflection coils.

* * * * *